United States Patent [19]

Nanya et al.

[11] Patent Number: 4,465,341
[45] Date of Patent: Aug. 14, 1984

[54] ALL SOLID STATE COMPLEMENTARY ELECTROCHROMIC DISPLAY DEVICES

[75] Inventors: Takanori Nanya, Sayama; Eigo Hashimoto, Sakado; Katsuo Nishimura, Tokorozawa, all of Japan

[73] Assignee: Citizen Watch Co., Ltd., Tokyo, Japan

[21] Appl. No.: 384,524

[22] Filed: Jun. 3, 1982

[30] Foreign Application Priority Data

Jun. 23, 1981 [JP] Japan ................................ 56-97180

[51] Int. Cl.³ ............................ G02F 1/01; G02F 1/17
[52] U.S. Cl. ................................................. 350/357
[58] Field of Search ........................ 350/335, 353, 357

[56] References Cited

U.S. PATENT DOCUMENTS

| 4,294,518 | 10/1981 | O'Connor et al. | 350/357 |
| 4,384,763 | 5/1983 | Russo | 350/355 |
| 4,403,832 | 9/1983 | Tanaka et al. | 350/355 |

Primary Examiner—Bruce Y. Arnold
Assistant Examiner—William Propp
Attorney, Agent, or Firm—Koda and Androlia

[57] ABSTRACT

A solid state complementary electrochromic display device in which electrochromic display elements comprising a first electrochromic material layer of a reduction coloration type consisting essentially of tungsten trioxide, a second electrochromic material layer of an oxidation coloration type consisting essentially of iridium oxide or rhodium oxide, and an ion permeable insulating layer disposed between both layers are formed on one surface and on the opposite surface of a transparent substrate.

8 Claims, 5 Drawing Figures

ALL SOLID STATE COMPLEMENTARY ELECTROCHROMIC DISPLAY DEVICES

BACKGROUND OF THE INVENTION

1. Field of the Invention

This invention relates to display devices utilizing an electrochemical coloration-bleaching phenomenon, that is, an electrochromic (EC) phenomenon and, more particularly, all solid state EC display devices using a reduction coloration type EC material layer and an oxidation coloration type EC material layer.

2. Description of the Prior Art

An all solid state complementary electrochromic display device, for example, disclosed in Japanese Published unexamined Patent Application No. 56-4679 issued by the Japanese Patent Office on Jan. 19, 1981, includes a pair of electrode layers, an oxidation coloration type EC material layer which is capable of oxidation and reduction reactions and is colored in an oxidation state, a reduction coloration type EC material layer which is capable of oxidation and reduction reactions and is colored in a reduction state, and an ion permeable insulating layer which is interposed between both the EC material layers and passes protons but blocks electrons, these layers being disposed between said pair of electrode layers. With this arrangement, by the application of a voltage across the electrodes, the EC material layers exhibit the coloration-bleaching phenomenon simultaneously. Compared with a conventional EC display device using a single EC material of either an oxidation or a reduction coloration type, this complementary EC structure has an improved response time; the time required until the optical density reaches 1.0 is 0.5 seconds while it has been several seconds in the past. However, in order to display the seconds of a watch, the response time should be reduced to about 100 ms. Thus, the response time is not satisfactory, resulting in the low reliability of the device.

For another electrochromic display device, a U.S. Pat. was issued on Apr. 8, 1979 (see U.S. Pat. No. 4,147,416). This device includes "a transparent front substrate, at least one transparent display electrode provided on the front substrate, a counter substrate provided parallel and adjacent the front substrate, at least one display electrode provided on the counter substrate adjacent the display electrode on the front substrate, a transparent electrolyte enclosed within the substrate, an electrochromic material provided in the electrolyte a counter electrode which is coupled to the electrolyte and a means for selectively applying voltage between the counter electrode and the display electrodes" (column 2, lines 3-14). In this device, by driving both the electrodes to produce the half of the coloration required for the display, the normal colored state can be obtained through the overlapping electrodes. This device has a fast response time and makes the second display possible. However, using two substrates results in a total device thickness of about 1.5-3 mm including the electrolyte. Further, for the fabrication of the device, some processes of injecting the electrolyte, bonding or the like are necessary.

SUMMARY OF THE INVENTION

The principal objects of the invention is to remedy the aforesaid drawbacks of the prior art and to provide a solid state EC display device which has a short response time of 100 ms or less and is of a thin type manufacturable only by the thin film technology.

Another object of the invention is to provide an EC display device which is widely practical and gives many pieces of information by enhancing the integration of the display pattern.

According to the invention, a solid state complementary EC display device fulfilling the above objects includes an optically transparent substrate; first complementary EC display elements comprising a first electrode which is formed on one surface of the substrate and is optically transparent, a first EC material layer which is formed on a top surface of the first electrode, is capable of oxidation and reduction reactions and is colored by one of the oxidation and reduction reactions, a first ion permeable insulating layer which is formed on a top surface of the first EC material layer, a second EC material layer which is formed on a top surface of the ion permeable insulating layer, is capable of oxidation and reduction reactions and is colored by the reaction opposite to that of the first electrochromic material layer of the oxidation and reduction reactions, and a second electrode which is formed on a top surface of the second EC material layer and is optically transparent; and second complementary EC display elements comprising a third electrode which is formed on the other surface of the transparent substrate and is optically transparent, a third EC material layer which is formed on a top surface of the third electrode, is capable of oxidation and reduction reactions, and is colored by one of the oxidation and reduction reactions, a second ion permeable insulating layer which is formed on a top surface of the third EC material layer, a fourth EC material layer which is formed on a top surface of the second ion permeable insulating layer, is capable of oxidation and reduction reactions, and is colored by the reaction opposite to that of the third electrochromic material layer of the oxidation and reduction reactions, a fourth electrode which is formed on a top surface of the fourth EC material layer and is optically transparent.

BRIEF DESCRIPTION OF THE DRAWINGS

In FIG. 1, FIG. 4 and FIG. 5, the thicknesses of thin film layers are exaggerated as compared with that of the substrate to facilitate the understanding of the physical and chemical relation.

DESCRIPTION OF THE PREFERRED EMBODIMENTS

Example 1

Figure 1:
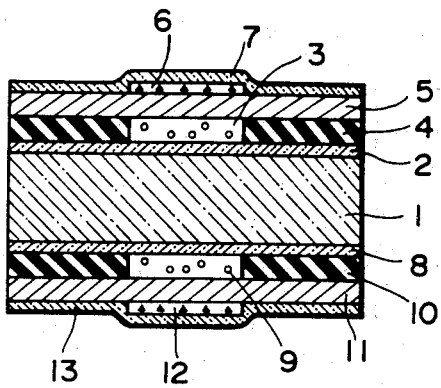
FIG. 1 is a sectional view of a solid state complementary EC display device having complementary EC display elements provided on both surfaces of a substrate in accordance with a first example of the invention, the elements having the same patterns as each other.
Figure 2:
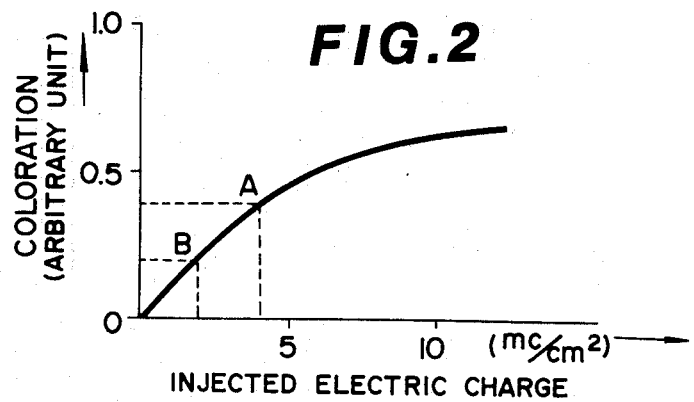
FIG. 2 is a characteristic view showing coloration vs. injected electric charge of the device of FIG. 1.
Figure 3:
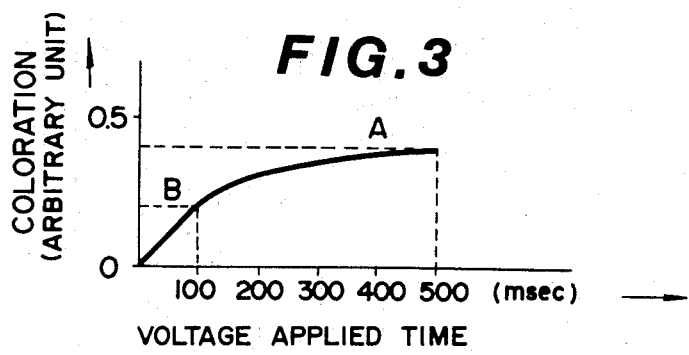
FIG. 3 is a characteristic view showing coloration vs. voltage applied time of the device of FIG. 1.

The structure of a device is shown in FIG. 1. After a transparent conductive film 2 with a sheet resistance of 10 ohms is placed on one surface of an about 500μ thick transparent substrate 1, a 0.5–1μ thick tungsten trioxide layer for use as a reduction coloration type EC material layer 3 is deposited so as to portray the intended display pattern by a physical vapor deposition (PVD) method including an ion plating (IP) method. The region where the pattern of tungsten trioxide layer is not formed is deposited with an insulating layer 4 to prevent current leakage. Next, tantalum oxide 0.3–1.5μ thick is deposited by the IP method as an ion permeable insulating layer 5 which passes protons but blocks electrons. Then, in the same pattern as the tungsten trioxide pattern, 200–1000 Å thick iridium oxide for use as an oxidation coloration type EC material layer 6 is deposited by the same IP method, whereby the EC material layers 3, 6 provide a first complementary display pattern. Lastly, a transparent conductive layer 7 with a sheet resistance of 20 ohms is formed, thus making first complementary EC display elements. In the same method, on the opposite surface of the transparent substrate 1 are deposited a transparent conductive film 8, reduction coloration type EC material layer 9, insulating layer 10, ion permeable insulating layer 11, oxidation coloration type EC material layer 12 and transparent conductive film 13, whereby the EC material layers 9, 12 provide a second complementary display pattern which is the same in configuration and region occupied on the plane of the device as that of the first complementary display pattern. Thus, complementary EC elements are fabricated respectively on both surfaces of the transparent substrate. When the transparent conductive films 2 and 8 are connected and the transparent conductive films 7 and 13 are connected to drive the entire device, coloring and bleaching of the EC material layers 3, 6 and 9, 12 on both surfaces of the transparent substrate can be seen in the same patterns through the successive layers. In this example, while bleached, each of the constructed layers is transparent, and while colored, since the first and the second complementary EC elements are operated at the same time and the four EC material layers are used for the coloration, the color becomes two times deeper than that of the conventional complementary EC device under the same driving conditions. Each of both complementary EC elements of this example requires only half the coloration of the conventional device. This behavior is shown in FIG. 2. FIG. 2 shows the coloration and the quantity of injected electric charge of the complementary EC device. In this graph, (A) indicates the driving condition of the conventional complementary EC device and (B) indicates that of this example. For the longer service life of the device, it is desirable to drive it in a range that the coloration is proportional to the quantity of injected electric charge. In this example, the proportional relation between them is completely established. After $10^7$ cycles at 1 Hz, no degradation is observed and very longer service life is attained. FIG. 3 shows the relation between coloration and voltage applied time at 1.5 V. In the graph, similar to FIG. 2, (A) shows the driving condition of the conventional device and (B) shows that of the present device. The conventional complementary EC display requires 500 msec to reach a coloration of 0.4, while this example obtains a coloration of 0.2 in 100 msec. Bleaching response time shows a similar tendency. Then, compared with the conventional device, since the device of this invention permits to be driven in the range of low coloration, the applied voltage can be reduced and the second display can be driven at ±1 V. Further, the device needs only one substrate with thin films deposited thereon. As a result, the thickness of the device becomes substantially the same as that of the conventional solid state complementary EC display device having complementary display elements on one surface of the substrate. Thus, in this invention, a device with a thickness of a glass substrate has been realized.

Example 2

Figure 4:
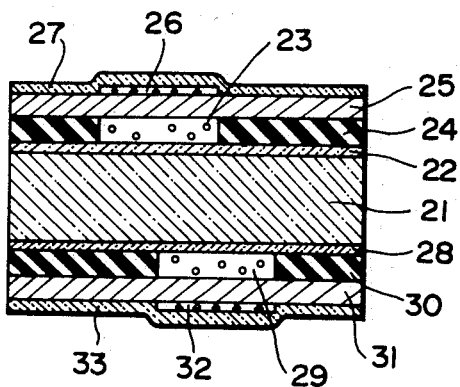
FIG. 4 is a sectional view of a solid state complementary EC device having complementary EC display elements provided on both surfaces of a substrate in accordance with a second example of the invention, the elements having different display patterns from each other.

The structure of another device is shown in FIG. 4. In the same manner as in example 1, on both surfaces of a transparent substrate 21, transparent conductive electrode layers 22, 28, reduction coloration type EC material layers 23, 29, insulating layers 24, 30, ion permeable insulating layers 25, 31, oxidation coloration EC material layers 26, 32 and upper transparent conductive films 27, 33 are successively deposited to make first and second complementary EC display elements. This example is different from example 1 in that the display patterns on both surfaces of the transparent substrate are different in configuration and position. In this example, by applying a voltage across transparent conductive films 22, 27, the complementary EC display elements formed one surface of the substrate can be colored or bleached and by applying a voltage across transparent conductive electrode layers 28, 33, the complementary EC display elements on the other surface can be operated, thereby allowing different patterns to be displayed on both surfaces of the substrate. There are a variety of displays for a watch. If the displays are arranged on both surfaces of the substrate, the limited space of the watch can effectively be used so as to assure a variety of displays. For example, the normal time is displayed on one surface of the substrate and by switching to the opposite surface display, functional displays such as alarm setting and timer display are effected. The integration of the displays is substantially enhanced. Also, driving both surfaces at the same time causes some portions to be seen with the coloration of both surfaces overlapped and the other portions to be seen with the coloration of one side, thus permitting different color tone displays and a variety of displays.

Example 3

Figure 5:
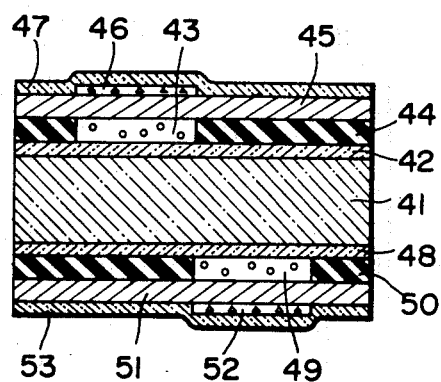
FIG. 5 is a sectional view of a solid state complementary EC device having complementary EC display elements provided on both surfaces of a substrate in accordance with a third example of the invention, the elements having different display patterns from each other and the patterns not overlapping.

The structure of a further device is shown in FIG. 5. In the same manner as in example 1, on both surfaces of a transparent substrate 41, transparent conductive electrode layers 42, 48, reduction coloration type EC material layers 43, 49, insulating layers 44, 50, electrolyte layers 45, 51, oxidation coloration type EC material layers 46, 52 and upper transparent conductive films 47, 53 are successively deposited, thus fabricating a device. This example is different from examples 1 and 2 in that when viewed from the outside the display patterns on one surface and the opposite surface are positioned so that they do not overlap each other. This example, like example 2, permits not only switching the displays from one to the other surface, but also combining the displays on both surfaces for the specified patterns. Since the EC display device is current-driven, the transparent conductive film cannot be divided into small patterns. This example, therefore, becomes a very effective means. For instance, when seven segments are driven, previously there has been a problem: Providing the electrodes on one surface in the conventional manner increases the resistance of the inside segment among them owing to its limited electrode configuration. The inside segment is different from the other segments in operation characteristics and that area suffers rapid deterioration. In this example, when the seven segments are divided onto both surfaces, uniform operation characteristics can easily be obtained within the device.

Each example has heretofore been described as for a case where the first and the third EC material layers are of the reduction coloration type and the second and the fourth EC material layers are of the oxidation coloration type. However, needless to say, it is possible that the first and the third EC material layers are made the oxidation coloration type and the second and the fourth EC material layers the reduction coloration type. Also, it is of course possible to use the first and the fourth EC layers of the reduction coloration type and the second and the third EC layers of the oxidation coloration type. Each of them produces the same effect.

Although certain preferred embodiments of the invention have been shown and described in detail, it should be understood that various changes and modifications may be made therein without departing from the scope of the appended claims.

What is claimed is:

1. A solid state complementary electrochromic display device including:
   (1) an optically transparent substrate;
   (2) first complementary electrochromic display elements comprising,
      (a) a first electrode which is formed on one surface of said substrate and is optically transparent,
      (b) a first electrochromic material layer which is formed on a top surface of said first electrode, is capable of oxidation and reduction reactions, and is colored by one of the oxidation and reduction reactions,
      (c) a first ion permeable insulating layer which is formed on a top surface of said first electrochromic material layer,
      (d) a second electrochromic material layer which is formed on a top surface of said first ion permeable layer, is capable of oxidation and reduction reactions and is colored by the reaction opposite to that of the first electrochromic material layer of the oxidation and reduction reactions,
      (e) a second electrode which is formed on a top surface of said second electrochromic material layer and is optically transparent; and
   (3) second complementary electrochromic display elements comprising,
      (a) a third electrode which is formed on the other surface of said transparent substrate and is optically transparent,
      (b) a third electrochromic material layer which is formed on a top surface of said third electrode, is capable of oxidation and reduction reactions, and is colored by one of the oxidation and reduction reactions,
      (c) a second ion permeable insulating layer which is formed on a top surface of said third electrochromic material layer,
      (d) a fourth electrochromic material layer which is formed on a top surface of said second ion permeable insulating layer, is capable of oxidation and reduction reactions, and is colored by the reaction opposite to that of the third electrochromic material layer of the oxidation and reduction reactions,
      (e) a fourth electrode which is formed on a top surface of said fourth electrochromic material layer and is optically transparent.

2. The solid state complementary electrochromic display device according to claim 1 wherein said first electrochromic material layer is patterned so as to occupy a limited region on a plane of said display device, said second electrochromic material layer is patterned the same as said first electrochromic material layer, whereby said patterned first and second electrochromic material layers provide a first complementary display pattern, and wherein said third electrochromic material layer is patterned so as to occupy a limited region on the plane of said display device, and said fourth electrochromic material layer is patterned the same as said third electrochromic material layer, whereby said patterned third and fourth material layers provide a second complementary display pattern.

3. The solid state complementary electrochromic display device according to claim 2 wherein a portion except said first complementary display pattern between said first transparent electrode and said ion permeable insulating layer and a portion except said second complementary display pattern between said third transparent electrode and said second ion permeable insulating layer are provided with electric insulating layers, respectively.

4. The solid state complementary electrochromic display device according to claim 3 wherein said first complementary display pattern and said second complementary display pattern are the same display patterns and occupy the same regions on the plane of the device.

5. The solid state complementary electrochromic display device according to claim 3 wherein said first complementary display pattern and said second complementary display pattern are different display patterns from each other.

6. The solid state complementary electrochromic display device according to claim 5 wherein said first complementary display pattern and said second complementary display pattern occupy the same regions partially on the plane of the device.

7. The solid state complementary electrochromic display device according to claim 5 wherein said first complementary display pattern and said second complementary display pattern occupy different regions from each other on the plane of the device.

8. The solid state complementary electrochromic display device according to any of claim 1 to claim 6 wherein said reduction coloration type electrochromic material layer consists essentially of tungsten trioxide and said oxidation coloration type electrochromic material layer consists essentially of iridium oxide or rhodium oxide.

* * * * *